(12) United States Patent
Benn

(10) Patent No.: US 10,075,840 B2
(45) Date of Patent: Sep. 11, 2018

(54) DEVICE AND OPERATION METHOD THEREOF

(71) Applicant: Samsung Electronics Co., Ltd., Suwon-si, Gyeonggi-do (KR)

(72) Inventor: Howard Peter Benn, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/110,222

(22) PCT Filed: Jan. 9, 2015

(86) PCT No.: PCT/KR2015/000232
§ 371 (c)(1),
(2) Date: Jul. 7, 2016

(87) PCT Pub. No.: WO2015/105374
PCT Pub. Date: Jul. 16, 2015

(65) Prior Publication Data
US 2016/0330608 A1    Nov. 10, 2016

(30) Foreign Application Priority Data

Jan. 10, 2014  (GB) .................................. 1400428.7

(51) Int. Cl.
*H04W 8/18* (2009.01)
*H04W 12/04* (2009.01)
*H04W 12/10* (2009.01)
*H04W 12/06* (2009.01)

(52) U.S. Cl.
CPC .......... *H04W 8/183* (2013.01); *H04W 12/04* (2013.01); *H04W 12/06* (2013.01); *H04W 12/10* (2013.01)

(58) Field of Classification Search
CPC ..... H04W 12/04; H04W 12/06; H04W 12/10; H04W 8/183
See application file for complete search history.

(56) References Cited

U.S. PATENT DOCUMENTS

| 8,244,181 B2 | 8/2012 | Shuo |
| 9,326,146 B2 | 4/2016 | Bradley |
| 2003/0120920 A1 | 6/2003 | Svensson |
| 2009/0217348 A1 | 8/2009 | Salmela et al. |

(Continued)

FOREIGN PATENT DOCUMENTS

| EP | 2696612 A1 | 2/2014 |
| KR | 10-2013-0026351 A | 3/2013 |

(Continued)

OTHER PUBLICATIONS http://www.theverge.com/2012/6/1/3057577/etsi-euicc-embedded-sim-apple ("Embedded SIMs they're happening, and Apple thinks they could be in consumer products Published on Jun. 1, 2012").

(Continued)

*Primary Examiner* — Kashif Siddiqui
(74) *Attorney, Agent, or Firm* — Jefferson IP Law, LLP

(57) ABSTRACT

A device is disclosed. The device includes a communication unit configured to transmit a subscription request to a primary subscriber device and receive a provisioning profile in response to the subscription request and a universal integrated circuit card (UICC) configured to be provisioned based on the received provisioning profile.

19 Claims, 8 Drawing Sheets

(56) References Cited

U.S. PATENT DOCUMENTS

| | | | |
|---|---|---|---|
| 2010/0087167 A1* | 4/2010 | Tsurutome | H04L 67/2814 |
| | | | 455/411 |
| 2013/0023235 A1* | 1/2013 | Fan | H04W 48/18 |
| | | | 455/411 |
| 2013/0148585 A1 | 6/2013 | Ohlsson et al. | |
| 2013/0183932 A1* | 7/2013 | Lemilainen | H04W 12/04 |
| | | | 455/411 |
| 2013/0201980 A1* | 8/2013 | Rahul | H04W 88/08 |
| | | | 370/338 |
| 2013/0237203 A1 | 9/2013 | Oertle et al. | |
| 2013/0340059 A1 | 12/2013 | Christopher et al. | |
| 2014/0004827 A1 | 1/2014 | O'Leary | |
| 2014/0066011 A1 | 3/2014 | Bradley | |
| 2014/0106728 A1 | 4/2014 | Aboulhosn et al. | |
| 2014/0219447 A1 | 8/2014 | Park et al. | |
| 2014/0329502 A1 | 11/2014 | Lee et al. | |
| 2015/0172968 A1* | 6/2015 | Lund | H04W 36/0066 |
| | | | 455/411 |
| 2015/0349825 A1* | 12/2015 | Lee | H04W 8/205 |
| | | | 455/558 |

FOREIGN PATENT DOCUMENTS

| | | |
|---|---|---|
| KR | 10-2013-0108637 A | 10/2013 |
| WO | 2011-115407 A3 | 9/2011 |
| WO | 2013027085 A1 | 2/2013 |
| WO | 2013-036010 A1 | 3/2013 |
| WO | 2013-065991 A1 | 5/2013 |
| WO | 2015-105374 A1 | 7/2015 |

OTHER PUBLICATIONS

3rd Generation Partnership Project; Technical Specification Group Services and System Aspects; Feasibility study on the security aspects of remote provising and change of subscription for Machine to Machine equipment (Release 9); 3GPP TR 33.812 (V9.2.0)(Jun. 2010).

\* cited by examiner

DEVICE AND OPERATION METHOD THEREOF

TECHNICAL FIELD

This disclosure relates to a device and an operation method thereof, and more particularly, to a device for provisioning and an operation method thereof.

BACKGROUND ART

A recent development in third generation (3G) wireless communications is the long term evolution (LTE) cellular communication standard, sometimes referred to as $4^{th}$ generation (4G) systems. Both 3G and 4G technologies are compliant with third generation partnership project (3GPP™) standards.

A universal integrated circuit card (UICC) is a smart card used in mobile terminals in global system for mobile communications (GSM) and LTE networks to store, inter alia, subscriber data. The UICC ensures the integrity and security of all kinds of personal data, and it typically holds a few hundred kilobytes. With the advent of more services, it is known that the storage space for UICCs will need to be larger.

There has also been a recent trend for machine to machine (M2M) communication modules to be integrated directly into target (M2M) devices, such as Automated Meter Readers (AMRs), vending machines, alarm systems, automotive equipment or others. Such M2M devices have also been configured with wireless capability. Thus, with the advent of machine to machine (M2M) devices including communication modules that use cellular modems, new M2M form factors (MFF) have been developed. These MFF components replace the conventional, removable subscriber information module (SIM) card with a fixed (i.e. soldered), embedded universal integrated circuit card (eUICC) that is incorporated into M2M devices.

As the eUICC is to be embedded into devices, there have been some initial discussions within the technical community about over-the-air provisioning of eUICCs, in order to allow a subscription manager (SM) to upload a new profile to the eUICC. In this manner, new profiles may be wirelessly programmed into the M2M devices, for example in order to facilitate switching between mobile network operators (MNOs). These uploaded profiles are generally denoted as operational profiles, and include one or more network access application(s) (NAA) and associated network access credentials (NAC). The one or more network access application(s) are application(s) that reside on an eUICC, providing authorization to access a network. Network access credentials include data required to authenticate to an ITU E.212 network, and may include data such as international mobile subscriber identity (IMSI) value stored within the NAA.

In order for the eUICC to be provisioned over the air, the eUICC requires a preinstalled provisioning profile, which is a profile including one or more network access credentials, which, when preinstalled on an eUICC, enables a device utilizing the eUICC to access and communicate with communication network(s). This is generally achieved by the device initially attempting to access a mobile network operator's communication network, and in response to this the communication network transmits a message, including a 'challenge' sent over an air interface to the device, which is passed to the eUICC. The eUICC runs the message through its authentication algorithm, allowing the device to transit a response back via a corresponding base station to a home location register (HLR) of the mobile network operator. Further, the preinstalled provisioning profile provides the eUICC with the capability to manage operational profiles with a subscription manager (SM). Thus, when the device with the eUICC is turned 'on', information is sent to the SM, and this information may include information such as the country that the phone is located in. A decision may then be made with regard to the best network operator(s) to provision the card with. Hence, a pre-installed operational profile allows the eUICC to communicate with an operational network, for example Vodafone™.

Referring to FIG. 1, a known eUICC remote provisioning system is illustrated including, an eUICC manufacturer 101, a subscription manager (secure routing) (SM-SR) 103, a mobile network operator (MNO) 105, a certificate issuer 107, a subscription manager (data preparation) (SM-DP) 109, and an eUICC device, for example an M2M device 111.

The eUICC manufacturer 101 provides eUICCs including a provisioning profile and/or one or more operational profiles. Typically, the manufactured eUICCs are delivered to an M2M device for integration into their products. The eUICC manufacturer 101 is also responsible for initial cryptographic configuration and security architecture of the manufactured eUICCs.

The eUICC manufacturer 101 requests the provisioning profile from a desired mobile network operator 105, which provides the eUICC manufacturer 101 with input information, for example an international mobile subscriber identity value. Subsequently, the eUICC manufacturer 101 outputs information to the MNO 105 and SM-DP 109 including identity information of the relevant eUICC.

The certificate issuer 107 issues certificates for eUICC remote provisioning, and acts as a third party for the purpose of authentication.

Once the eUICC has been incorporated into a device/product 111, the MNO is made aware of the eUICC ID of the integrated eUICC within the device/product 111. As this information was provided to the MNO 105 during eUICC manufacture, the MNO 105 is operable to find related information in its databases (not shown) and trigger the SM-DP 109 to transmit an encrypted message including at least the eUICC ID to the SM-SR 103.

Subsequently, the eUICC device/product 111 communicates with a provisioning network, utilizing its preinstalled provisioning profile, and communicates with the SM-SR 103. The SM-SR 103 recognizes the eUICC's ID and downloads an encrypted profile including an operational profile.

Therefore, the eUICC device/product 111 is capable of being configured with an operational profile via an air interface, meaning that the operational profile may be changed by a user of the eUICC device/product 111.

In order for over the air provisioning to be utilized, the eUICC device/product 111 requires a provisioning profile, which is generally an identifier for an operator with many roaming agreements. When the eUICC device/product 111 is first enabled, information is transmitted to the SM-SR 103, which may include information, such as the country the eUICC device/product 111 is in. A decision is then made by the SM-SR 103 to allocate the best operator to provision the eUICC with.

A potential problem may be that MNOs are no longer responsible for issuing devices to consumers, as a consumer may purchase a device from the manufacturer of the eUICC device/product 111 and chose/change the MNO 105 over the air. This may affect the MNO's 105 profits and sale of subsequent peripheral devices.

Referring to FIG. 2, a known eUICC registration procedure 200 is illustrated. Generally, eUICCs are manufactured according to a particular standard and are independent from the M2M device manufacturers, mobile operators and service providers. Device manufacturers may select and certify an eUICC and order it directly from an eUICC manufacturer 201. As a mandatory step in the production process and prior to shipment, the eUICC manufacturer 201 must register each eUICC at a selected subscription manager SM-SR 203. The registration means that relevant information regarding a particular eUICC is stored in a database of the SM-SR 203. Without this registration step, remote access to the eUICC is impossible using standard practices.

Regarding the registration procedure 200 of FIG. 2, the eUICC manufacturer 201 transmits an eUICC registration request 205 to the selected SM-SR 203, including an eUICC information set (EIS). The SM-SR 203 stores the EIS in a database 207, utilizing the eUIDD ID (EID) of the eUICC as a key parameter. The SM-SR 203 confirms the successful registration by transmitting a confirmation message 209 including the EID to the eUICC manufacturer 201.

At this stage, the eUICC includes a provisioning profile and is linked to an active provisioning subscription. After registration has been completed at the SM-SR 203, the eUICC may be shipped to a device manufacturer.

There is a potential problem with this process in that each eUICC manufactured needs to be registered with a particular subscription manager 203, and include a provisioning profile with an associated provisioning subscription in order for the subscription manager 203 to be able to remotely access the eUICC in order to download information regarding one or more operational profiles. Such a process is inefficient and requires a provisioning profile being installed in each and every device.

DETAILED DESCRIPTION OF THE INVENTION

Technical Solution

A device according to some embodiments includes a communication unit configured to transmit a subscription request to a primary subscriber device and receive a provisioning profile in response to the subscription request and a universal integrated circuit card (UICC) configured to be provisioned based on the received provisioning profile.

Advantageous Effects of the Invention

A device may be manufactured and/or sold along with a UICC which is not provisioned or is provisioned.

DESCRIPTION OF THE DRAWINGS

Further details, aspects and embodiments of the disclosure will be described, by way of example only, with reference to the drawings. In the drawings, like reference numbers are used to identify like or functionally similar elements. Elements in the figures are illustrated for simplicity and clarity and have not necessarily been drawn to scale.

BEST MODE

Figure 1:
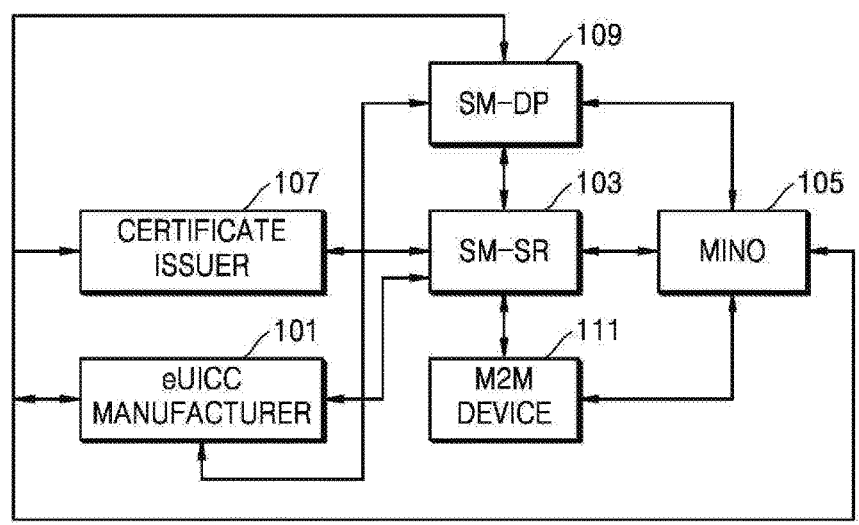
FIG. 1 illustrates a known embedded universal integrated circuit card (eUICC) remote provisioning system.
Figure 2:
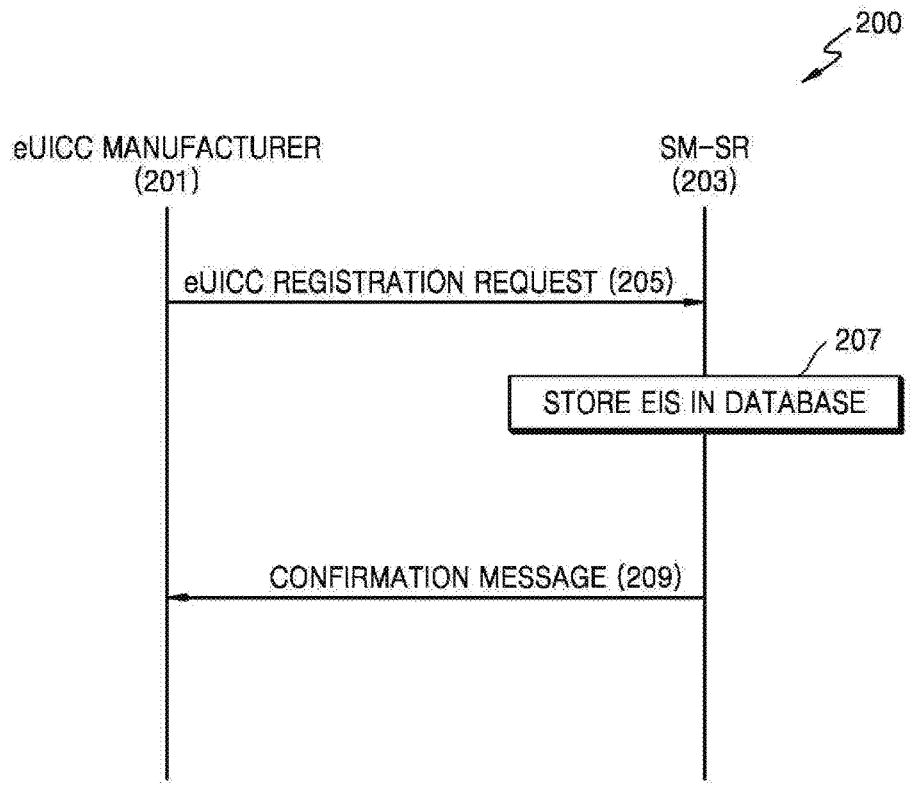
FIG. 2 illustrates a known eUICC registration procedure.

A device according to some embodiments includes a communication unit configured to transmit a subscription request to a primary subscriber device and receive a provisioning profile in response to the subscription request and a universal integrated circuit card (UICC) configured to be provisioned based on the received provisioning profile.

The communication unit may receive the provisioning profile from the subscription manager.

The communication unit may receive the provisioning profile from the subscription manager through the primary subscriber device.

The communication unit may receive the provisioning profile in an encrypted form from the primary subscriber device.

The device may further include a processor configured to set an operational profile, at least partially based on the received provisioning profile.

The subscription request may include at least one of an identifier of the device and an identifier of the UICC.

The communication unit may be paired with the primary subscriber device and may transmit the primary subscriber device, at least partially based on the pairing.

The provisioning profile may include a mobile network operator that is allocated differently from a mobile network operator for the primary subscriber device.

The provisioning profile may include a plurality of selectable mobile network operators.

A device according to some embodiments include a signal processor and a communication unit configured to establish a connection with a mobile network operator, notify a secondary device of the established connection, and receive a subscription request from the secondary device in response to the notification.

The signal processor may be configured to function as a relay device between the secondary device and the mobile network operator.

The communication unit may receive a provisioning profile for the secondary device from a subscription manager and transfers the provisioning profile to the secondary device.

The provisioning profile may include a mobile network operator that is allocated differently from the mobile network operator.

An operation method of a device includes transmitting a subscription request to a primary subscriber device, receiving a provisioning profile in response to the subscription request, and provisioning a universal integrated circuit card (UICC), based on the received provisioning profile.

The receiving of the provisioning profile may include directly receiving the provisioning profile from a subscriber manager or receiving the provisioning profile from the subscriber manager through the primary subscriber device.

The operation method may further include establishing a connection with the primary subscriber device.

The operation method may further include setting an operational profile, at least partially based on the provisioning profile.

The subscription request may include at least one of an identifier of the device and an identifier of the UICC.

The operation method may further include receiving a notification, indicating a connection established between the primary subscriber device and a mobile network operator, from the primary subscriber device.

Mode of the Invention

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

Figure 3:
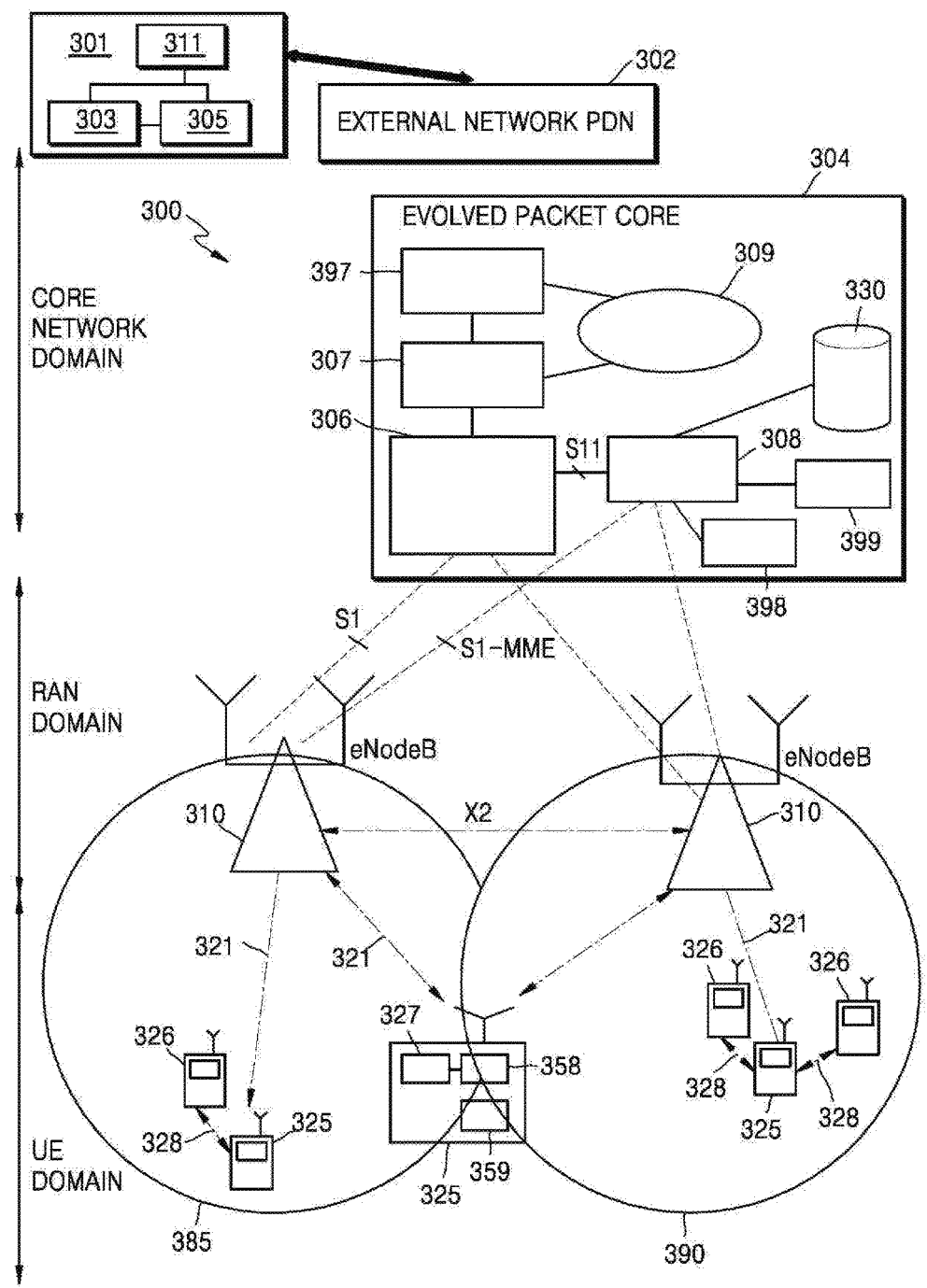
FIG. 3 illustrates a third generation partnership project (3GPP™) long term evolution (LTE) cellular communication system adapted according to some example embodiments of the present disclosure.

Referring now to FIG. 3, a wireless communication system 300 is shown in outline, according to one example embodiment of the disclosure. In this example embodiment, the wireless communication system 300 is compliant with, and includes network elements capable of operating over, an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 300 architecture includes radio access network (RAN) and core network (CN) elements 304, with the core network elements 304 being coupled to external networks 302 (named Packet Data Networks (PDNs)), such as the Internet or a corporate network. The external networks 302 may be operably coupled to a subscription manager (SM) element 301, which provides subscription information required to provision SIM cards/eUICCs. Optionally, the subscription manager may include a key store 311, a memory 303 and a processor 305.

The CN elements 304 include a packet data network gateway (P-GW) 307. In order to serve up local content, the P-GW may be coupled to a content provider. The P-GW 307 may be further coupled to a policy control and rules function entity (PCRF) 397 and a Gateway 306.

The PCRF 397 is operable to control policy control decision making, as well as for controlling the flow-based charging functionalities in a policy control enforcement function PCEF (not shown) that may reside in the P-GW 307. The PCRF 397 may further provide a quality of service (QoS) authorization class identifier and bit rate information that dictates how a certain data flow will be treated in the PCEF, and ensures that this is in accordance with a subscription profile of one or more UEs 325.

In example embodiments, the Gateway 306 is a Serving Gateway (S-GW). The Gateway 306 is coupled to a mobility management entity MME 308 via an S11 interface. The MME 308 is operable to manage session control of Gateway bearers and is operably coupled to a home subscriber server (HSS) database 330 that is arranged to store subscriber communication unit 325 (user equipment (UE)) related information. As illustrated, the MME 308 also has a direct connection to each eNodeB 310, via an S1-MME interface.

The HSS database 330 may store UE subscription data, such as QoS profiles and any access restrictions for roaming. The HSS database 330 may also store information relating to the P-GW 307 to which a UE 325 may connect. For example, this data may be in the form of an access point name (APN) or a packet data network (PDN) address. In addition, the HSS database 330 may hold dynamic information relating to the identity of the MME 308 to which a UE 325 is currently connected or registered.

The MME 308 may be further operable to control protocols running between the user equipment (UE) 325 and the CN elements 304, which are commonly known as Non-Access Stratum (NAS) protocols. The MME 308 may support at least the following functions that may be classified as: functions relating to bearer management (which may include the establishment, maintenance and release of bearers), functions relating to connection management (which may include the establishment of the connection and security between the network and the UE 325) and functions relating to inter-working with other networks (which may include the handover of voice calls to legacy networks). The Gateway 306 predominantly acts as a mobility anchor point and is capable of providing internet protocol (IP) multicast distribution of user plane data to eNodeBs 310. The gateway 306 may receive content via the P-GW 307, from one or more content providers 309 or via the external PDN 302. The MME 308 may be further coupled to an evolved serving mobile location center (E-SMLC) 398 and a gateway mobile location center (GMLC) 399.

The E-SMLC 398 is operable to manage the overall coordination and scheduling of resources required to find the location of the UE that is attached to the RAN, in this example embodiment the E-UTRAN. The GMLC 399 includes functionalities required to support location services (LCS). After performing an authorization, it sends positioning requests to the MME 308 and receives final location estimates.

The P-GW 307 is operable to determine IP address allocation for a UE 325, as well as QoS enforcement and flow-based charging according to rules received from the PCRF 397.

The P-GW 307 is further operable to control the filtering of downlink user IP packets into different QoS-based bearers (not shown). The P-GW 307 may also serve as a mobility anchor for inter-working with non-3GPP™ technologies such as CDMA2000 and WiMAX™ networks.

As the Gateway 306 includes an S-GW, the eNodeBs 310 may be connected to the S-GW 306 and the MME 308 directly. In this case, all UE packets may be transferred through the S-GW 306, which may serve as a local mobility anchor for the data bearers when a UE 325 moves between eNodeBs 310. The S-GW 306 is also capable of retaining information about the bearers when the UE 325 is in an idle state (known as EPS connection management IDLE), and temporarily buffers downlink data while the MME 308 initiates paging of the UE 325 to re-establish the bearers. In addition, the S-GW 306 may perform some administrative functions in the visited network, such as collecting information for charging (i.e. the volume of data sent or received from the UE 325). The S-GW 306 may further serve as a mobility anchor for inter-working with other 3GPP™ technologies such as GPRS™ and UMTS™.

As illustrated, the CN 304 is operably connected to two eNodeBs 310, with their respective coverage zones or cells 385, 390 and a plurality of UEs 325 receiving transmissions from the CN 304 via the eNodeBs 310.

The main component of the RAN is an eNodeB (an evolved NodeB) 310, which performs many standard base station functions and is connected to the CN 304 via an S1 interface and to the UEs 325 via a Uu interface. A wireless communication system will typically have a large number of such infrastructure elements where, for clarity purposes, only a limited number are shown in FIG. 3. The eNodeBs 310 control and manage the radio resource related functions for a plurality of wireless subscriber communication units/terminals (or user equipment (UE) 325 in 3GPP™ nomenclature). Each of the UEs 325 include at least a transceiver unit 327 operably coupled to signal processing logic 358 (with one UE illustrated in such detail for clarity purposes only). The system includes many other UEs 325 and eNodeBs 310, which for clarity purposes are not shown.

According to example embodiments of the present disclosure, at least one UE 325 and at least one secondary unit(s) 326 have been adapted to support the concepts hereinafter described. In one example, the UE 325 registers with the MNO and then establishes a connection between the UE 325 and the at least one secondary unit(s) 326. The at least one secondary unit(s) 326 then provides an indication of the connection to a secondary UICC or eUICC (not shown). Once the secondary eUICC has been informed of a communication link to the MNO, the secondary eUICC sends a subscription request, which in one example includes its eID, to the MNO. Upon successful reception and validation of the subscription request from the secondary eUICC, the MNO downloads a provisioning profile to the SM 301. The secondary eUICC may then be provisioned with a profile from the SM 301 by a variety of ways, as described hereinafter.

In some examples, the SM 301 may be operable to provision an initially unprovisioned UICC or eUICC within the at least one secondary unit(s) 326. This may occur if, for example, the at least one secondary unit(s) 326 is shipped directly from a manufacturer.

In some other examples, the SM 301 may be operable to re-provision an already provisioned UICC or eUICC within the at least one secondary unit(s) 326. For example, the SM 301 may be operable to provide an alternative provisioning profile to an already provisioned UICC or eUICC within the at least one secondary unit(s) 326, as well as being operable to provide an alternative operational profile.

Furthermore, the SM 301 may be operable to provide the UICC or eUICC within the at least one secondary unit(s) 326 with a number of selectable provisions. This may apply to an initially un-provisioned and provisioned UICC and eUICC within the at least one secondary unit(s) 326.

In some examples, one or more UEs 325 may be paired with one or more secondary devices 326, such as one or more M2M devices, as described with respect to later figures. In these examples, the one or more UEs 325 may be deemed primary devices. The one or more primary unit(s) 325 may be provisioned with a valid cellular subscription, and the one or more secondary unit(s) 326 may include at least one cellular modem, and include a UICC 359 that is capable of being provisioned with an operator's credentials (keys, for example). In some examples, the UICC may be capable of being provisioned may be an eUICC.

In some examples, the SIM card/eUICC vendor creates the provisioning profiles of devices, such as primary subscriber communication unit 325 and the secondary wireless communication unit(s) 326. The provisioning profiles may include, inter alia, the security keys that are created by the SIM card vendor and provisioned on the card, along with some other files provided by the MNO (such as the Java files to configure the SMS service center numbers, etc.). The SIM card vendor then sends this data to the MNO who uses that to provision the HSS database 330. For some operators the SIM card/eUICC vendors have direct access to the HSS database 330 and may be able to perform the provisioning directly.

In some examples, eUICC profiles may be stored within the external network 302, for example within a secure location of a SIM card/eUICC vendor. In some other examples, eUICC profiles may be transmitted to one or more MNOs, which may subsequently provision the HSS database 330. Further, in some examples, the subscription manager may include a key store 311 including secure key algorithms to generate secure keys for secure communication. The keys situated in the key store 311 may be utilized by the HSS database 330 as 'master keys' in order to derive keys for the MME 308, for example. The keys situated in the key store 311 may correspond with keys on one or more SIM card/eUICCs within primary subscriber communication unit 325/secondary wireless communication unit(s) 326. In some examples, the UICC in the primary subscriber communication unit 325 may be able to communicate with the UICC in the secondary wireless communication unit(s) 326 via a secure SMS, or via a secured data connection. The keys to enable the secured connection are obtained from key store 311 within the subscription manager 301, which has been adapted to additionally store the secondary wireless communication unit(s) 326 UICC credentials, which is obtained via the secondary UICC ID that is transported through primary subscriber communication unit 325 to the key store 311. In addition, in some examples, it is envisaged that the communication link from the primary subscriber communication unit 325 to the key store 311 may be encrypted using the algorithm and keys used for remote management, as described in ETSI TS 102 226.

In some examples, the keys sent to the UICC in the one or more secondary device 326, may also be sent to the HSS database 330. Further, in some examples, additional provisioning data may be sent to the HSS database along with the keys, which may, for example, include a UICC ID.

In some examples, a relevant MNO may allocate a phone number (e.g. MSISDN) for the one or more secondary device 326. In some other examples, the subscription manager 301 may pre-assign a phone number.

Furthermore, in some examples, the one or more secondary device 326 may be 'paired', or connected 328, to the primary device via, for example, a radio, wired or magnetic (NFC) interface.

In some examples, there may be a plurality of secondary devices 326 paired to a single primary device.

In some examples, the subscription manager 301 may include a memory 303 for storing a plurality of provisioning profiles and a signal processor 305 arranged to: receive a subscription request from a secondary wireless communication unit via a primary subscriber wireless communication unit; and transmit a provisioning profile to the secondary wireless communication unit direct or via the primary subscriber wireless communication unit. In some examples, the signal processor of the subscription manager may be further arranged to use information from the primary subscriber wireless communication unit's subscription to determine a profile to be used for the secondary wireless communication unit.

In some examples, the subscription manager 301 may provision the secondary device 326 with the same MNO as the primary subscriber communication unit 325.

In some examples, the subscription manager 301 may utilize information from the primary subscriber communication unit 325 to determine a profile for the secondary device 326, which may be different to the profile utilized by the primary subscriber communication unit 325. For example, if the primary subscriber communication unit 325 is utilizing Vodafone®, the subscription manager 301 may offer the secondary device 326 the same MNO, Vodafone®, or a different MNO, for example Orange®, based on information utilized from the primary subscriber communication unit 325, or from other information, for example location information or user requirements.

It should be noted that some of the above mentioned embodiments and examples have described eUICCs as being operable to receive provisioning profiles, i.e. being provisioned. This is merely for explanatory purposes, and concepts described herein may equally apply to UICCs, which may not be integrated within devices.

Figure 4A:
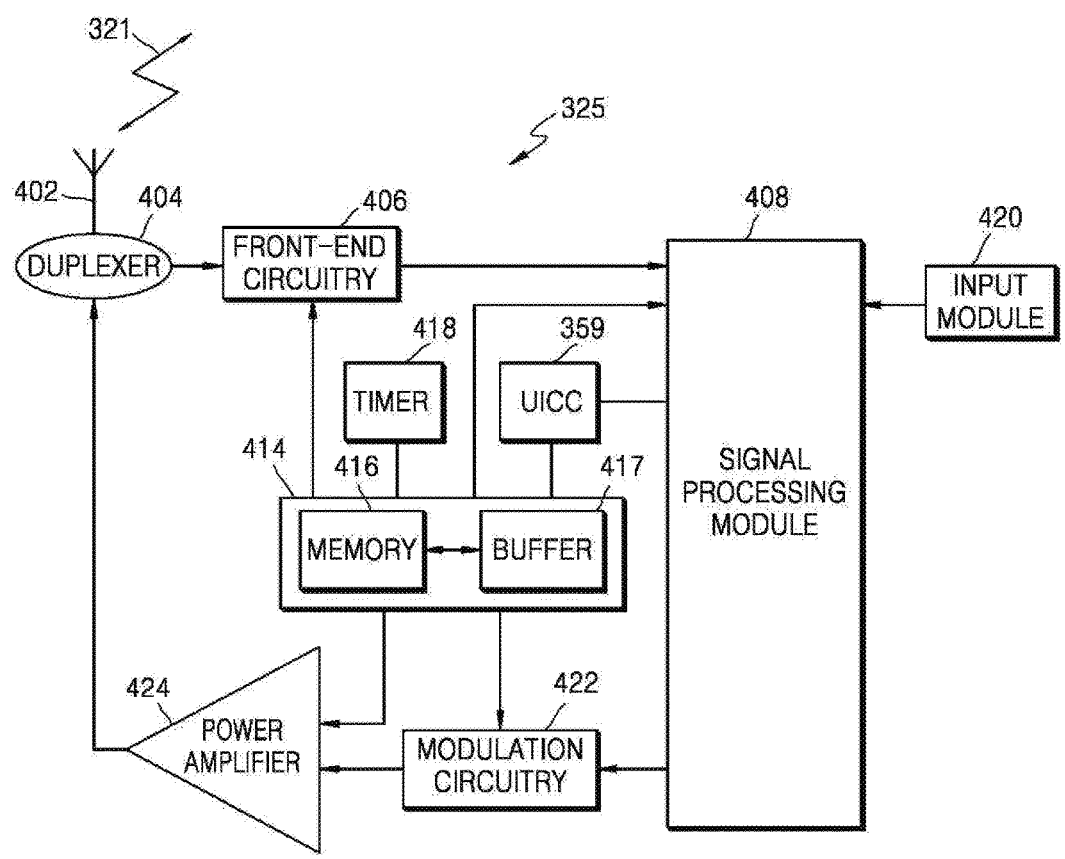
FIGS. 4A and 4B illustrate block diagrams of a wireless communication unit adapted according to some example embodiments of the disclosure.
Figure 4B:
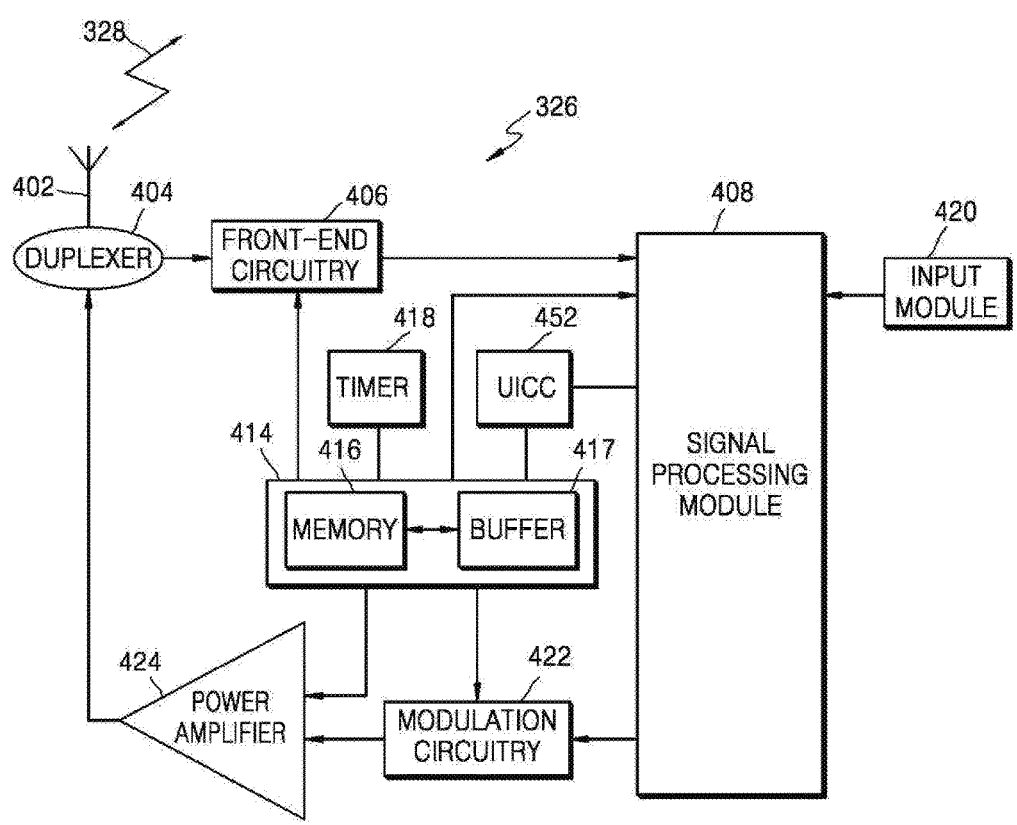

FIGS. 4A and 4B illustrate block diagrams of a primary subscriber wireless communication unit 325 and a secondary wireless communication unit 326, adapted in accordance with some example embodiments of the disclosure, is shown. In practice, purely for the purposes of explaining embodiments of the disclosure, the wireless communication units 325, 326 are described in terms of wireless communication units, such as UE 325 and secondary device 326.

The wireless communication unit 325, also referred to as the primary subscriber wireless communication unit, includes an antenna 402, for radiating transmit signals and for receiving transmissions 321 from another communication unit, such as eNodeB 310 in FIG. 3. The antenna 402 is coupled to an antenna switch or duplexer 404 that provides isolation between receive and transmit chains within the wireless communication unit 325. One or more receiver chains, as known in the art, include(s) receiver front-end circuitry 406 (effectively providing reception, filtering and intermediate or base-band frequency conversion). The receiver front-end circuitry 406 is coupled to a signal processing module 408 (generally realized by a digital signal processor (DSP)). A skilled artisan will appreciate that the level of integration of receiver circuits or components may be, in some instances, implementation-dependent.

The controller 414 maintains overall operational control of the wireless communication unit 325. The controller 414 is also coupled to the receiver front-end circuitry 406 and the signal processing module 408. In some examples, the controller 414 is also coupled to a buffer module 417 and a memory device 416 that selectively stores operating regimes, such as decoding/encoding functions, synchronization patterns, code sequences, and the like. A timer 418 is operably coupled to the controller 414 to control the timing of operations (e.g. transmission or reception of time-dependent signals) within the wireless communication unit 325. The controller 414 is also coupled to a UICC 359 that is capable of being provisioned with an operator's credentials (keys, for example). In some examples, the UICC capable of being provisioned may be an eUICC.

As regards the transmit chain, this essentially includes an input module 420, coupled in series through transmitter/modulation circuitry 422 and a power amplifier 424 to the antenna 402, antenna array, or plurality of antennas. The transmitter/modulation circuitry 422 and the power amplifier 424 are operationally responsive to the controller 414.

The signal processor module 408 in the transmit chain may be implemented as distinct from the signal processor in the receive chain. Alternatively, a single processor may be used to implement a processing of both transmit and receive signals, as shown in FIG. 4A. Clearly, the various components within the wireless communication unit 325 may be realized in discrete or integrated component form, with an ultimate structure therefore being an application-specific or design selection.

The wireless communication unit 326 shown in FIG. 4B, also referred to as the secondary wireless communication unit, includes similar modules to those described for the primary subscriber wireless communication unit 325. Therefore, only additional functionality of the secondary wireless communication unit 326 will be discussed in detail.

In some examples, the wireless communication unit 326 may additionally include a UICC or an eUICC 452. In some examples, the UICC or eUICC 452 may not be pre-provisioned and/or be registered with a subscription manager. Therefore, using current systems, such a non-provisioned device may not be able to connect to a provisioning network or an operational network, as there may be no record for any un-provisioned eUICC within the network. Furthermore, as the wireless communication unit 326 may not include a provisioning profile, it is currently be unable to communicate directly with the wireless communication system 300 of FIG. 3, via for example any communications link 321.

In this example, the secondary wireless communication unit 326 may be operable to communicate 328 with the primary communication unit 325 over any type of wireless (e.g. radio or Bluetooth™), wired or magnetic (e.g. near field communication (NFC)) interface. In this example, the secondary wireless communication unit 326 may 'pair' itself with the primary subscriber wireless communication unit 325 via, say, a Bluetooth™ communication link. Further, in this example, the primary subscriber wireless communication unit 325 may already be registered with a particular MNO.

In one example, if a connection is established to 'pair', the primary subscriber wireless communication unit 325 with the secondary wireless communication unit 326, the secondary wireless communication unit 326 may transmit a message to the primary subscriber wireless communication unit 325, where the message may indicate the associated eUICC identifier (eID) of the secondary wireless communication unit 326.

In the message, the eUICC in the secondary wireless communication unit 326 may also request subscription information from the MNO associated with the primary subscriber wireless communication unit 325. In one example, this may be achieved by the primary subscriber wireless communication unit 325 connecting to the associated MNO's web-based provisioning service, effectively with the primary subscriber wireless communication unit 325 acting as a relay device. In this manner, the primary subscriber wireless communication unit 325 facilitates information transfer between the secondary wireless communication unit 326 eUICC 359 and the MNO associated with the primary subscriber wireless communication unit 325.

In one example, in response to the subscription information request, the MNO may download at least one profile, which may be a provisioning profile, to an associated subscription manager, for example subscription manager 301, or the primary subscriber wireless communication unit 325 direct. The eUICC in the secondary wireless communication unit 326 may subsequently retrieve the provisioning profile from the subscription manager, either via the primary subscriber wireless communication unit 325 or direct from the primary subscriber wireless communication unit 325. The eUICC within the secondary wireless communication unit 326 may then set an operational profile for the secondary wireless communication unit 326 to initiate a connection to the MNO without requiring the primary subscriber wireless communication unit 325 to act as a relay device in subsequent communications.

Thus, in the abovementioned example embodiment, the signal processor 408, together with elements of the receiver and transmitter chains of the primary subscriber wireless communication unit 325, have been adapted to enable the primary subscriber wireless communication unit 325 to function as a relay device between the secondary wireless communication unit 326 and the MNO associated with the primary subscriber wireless communication unit 325.

In one example, in response to the subscription information request, the MNO may download at least one profile, which may be a provisioning profile, to an associated subscription manager. The eUICC in the secondary wireless communication unit 326 may subsequently retrieve the provisioning profile direct from the subscription manager and set an operational profile, thereby enabling the secondary wireless communication unit 326 to initiate a connection to set a profile to the MNO via the primary subscriber wireless communication unit 325, yet retrieve the profile without having the primary subscriber wireless communication unit 325 acting as a relay device in the delivery of the profile.

In some examples, the subscription manager may not automatically allocate the same MNO for the secondary wireless communication unit 326 as for the primary subscriber wireless communication unit 325. Therefore, in some examples, the subscription manager may decide which MNO to offer the secondary wireless communication unit 326.

In yet further examples, the user of the secondary wireless communication unit 326 may be able to choose a MNO from a number of MNOs supplied by the subscription manager, which may not necessarily include the MNO of the primary subscriber wireless communication unit 325.

In another example, rather than the eUICC within the secondary wireless communication unit 326 retrieving a provisioning profile from the subscription manager, the subscription manager may, alternatively, download one or more provisioning profiles to the primary subscriber wireless communication unit, say via one or more encrypted SMS messages. In response to this, the primary subscriber wireless communication unit 325 may transmit a further encrypted SMS message including at least the one or more provisioning profiles to the secondary wireless communication unit 326, which may further transfer the details of the encrypted SMS message onto the eUICC within the secondary wireless communication unit 326.

In a yet further example embodiment a primary eUICC 359 is located within the primary subscriber wireless communication unit 325. The primary subscriber wireless communication unit 325 registers with a MNO and establishes a connection with the secondary wireless communication unit 326. The processor 408 or primary eUICC 359 then provides an indication of the connection to the secondary eUICC 452. Once the secondary eUICC 452 has been informed of a communication link to the MNO, the secondary eUICC 452 sends a subscription request, which in one example includes its eID, to the MNO via communication link 328 to the primary subscriber wireless communication unit 325 and via communication link 321 to the MNO.

In one example, the SM may download over communication link 321 a profile to the primary subscriber wireless communication unit 325, which in turn decrypts and re-encrypts a message, say a short message service (SMS) message, to transmit 328 to the secondary wireless communication unit 326. The secondary wireless communication unit 326, then either forwards the encrypted message to the secondary eUICC 452, for the provisioning of the secondary eUICC 452, or decrypts the encrypted message, if it has access to the relevant key within the secondary eUICC 452, and forwards the un-encrypted message to the secondary eUICC 452. In this manner, provisioning of the secondary eUICC 452 may be achieved using the primary subscriber wireless communication unit 325 as a relay device.

In a still yet further example embodiment the processor 408 of the primary subscriber wireless communication unit 325 or the primary eUICC 359 sends/forwards a subscription request over communication link 321 to the MNO, which in one example includes its own UICC ID or eUCCID (eID) and/or the eID of the secondary eUICC.

In a yet further example embodiment, it is envisaged that UEs may be initially provisioned with a finite number of provisioning profiles, with the finite number of provisioning profiles linked to the provisioning profile of the UE. In one example, the UE may be arranged to provision one or more secondary wireless communication units from the finite number of provisioning profiles that are linked to the provisioning profile of the UE. In some examples, the one or more secondary wireless communication units (e.g. a watch or camera with wireless capability) may need to be registered on the UE, and once registered the UE is able to provision an EID (eUICC ID) of the secondary wireless communication unit using one of the finite number of provisioning profiles. In another example, such a scenario may be used by a business that wishes to provision each of its own secondary wireless communication units, e.g. utility measurement devices. In a yet further example, such a scenario may be used by a parent that wishes to provision each of their children's secondary wireless communication unit, e.g. phone, watch, camera, etc., with the provisioning being linked to (and to some degree controlled by) the parent, in order to control contract costs/tariffs, etc.

Figure 5:
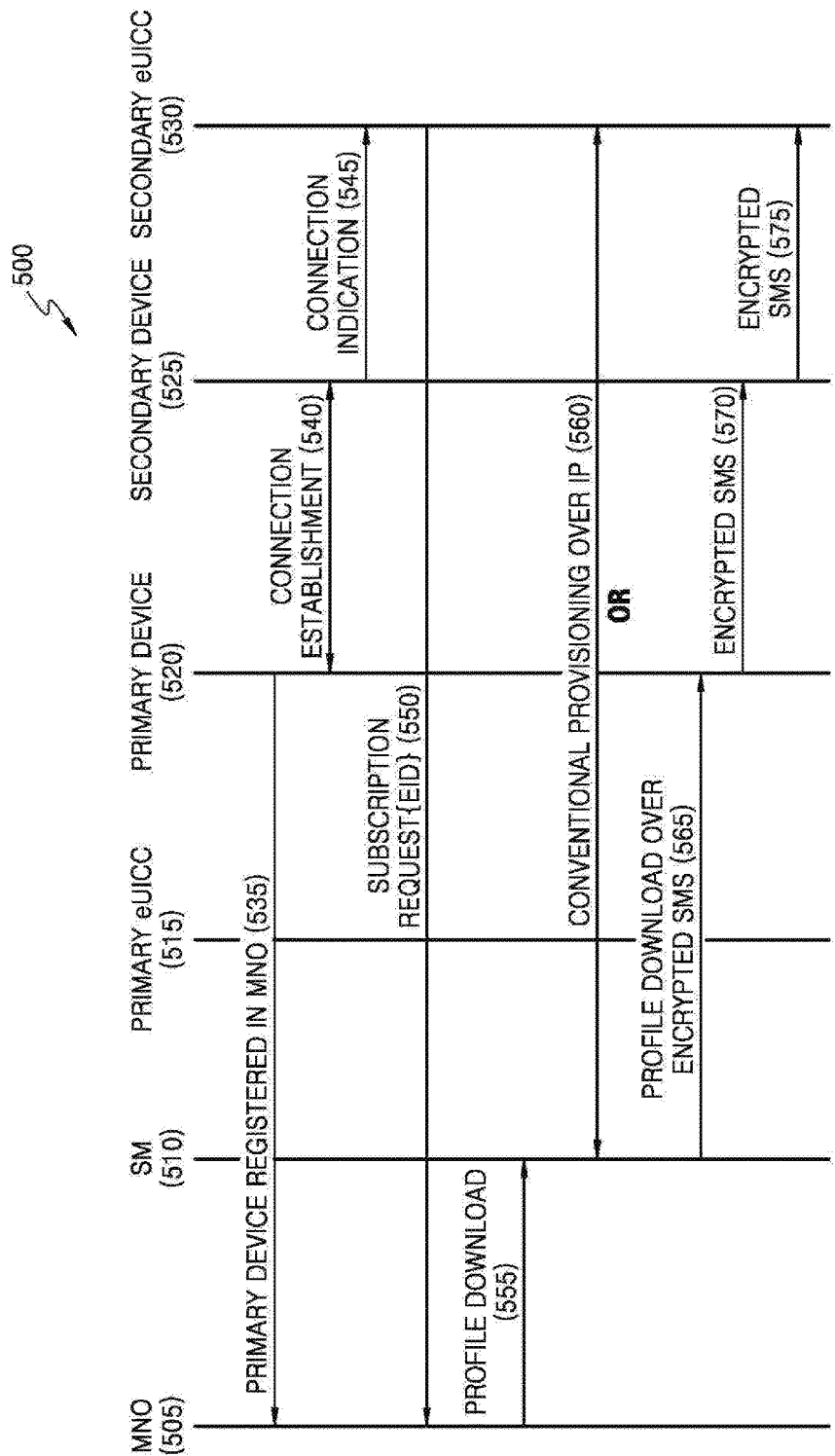
FIG. 5 illustrates a message sequence chart for provisioning a secondary wireless communication unit via a primary subscriber wireless communication unit, according to some example embodiments of the disclosure.

Referring now to FIG. 5, an example message sequence chart 500 illustrates one example mechanism for provisioning a secondary wireless communication unit from a primary subscriber wireless communication unit. The example message sequence chart 500 illustrates communications between a MNO 505, a SM 510, a primary eUICC 515, for example located within a primary subscriber wireless communication unit 520 that includes wireless transmit/receive capabilities, a secondary wireless communication unit 525 that includes a secondary eUICC 530.

The example message sequence chart 500 commences with the primary subscriber wireless communication unit 520 registering with the MNO 505 at 535. A connection is then established between the primary subscriber wireless communication unit 520 and the secondary wireless communication unit 525 at 540. The secondary wireless communication unit 525 then provides an indication of the connection to the secondary eUICC 530 at 545.

Once the secondary eUICC 530 has been informed of a communication link to the MNO 505 at 545, the secondary eUICC 530 sends a subscription request, which in one example includes its eID, to the MNO 505 at 550.

In this example, the subscription request 550 cannot be transmitted to the MNO 505 utilizing the wireless cellular system of FIG. 5, as the secondary eUICC 530 has not been provisioned. Therefore, in some examples, the subscription request 550 may be transmitted to the MNO 505 via a subscription system (not shown).

In some examples, the subscription system may be a website or a structured query language (SQL) database, accessed via a wired or wireless data connection over a data network e.g. the Internet. In some examples, the wired or wireless data connection may belong to the user of the secondary device 525.

In some further examples, the secondary eUICC 530 may transmit the subscription request 550 with EID to the MNO 505 via the subscription system. The EID of the secondary eUICC 530 may be required in order to trigger a subsequent provisioning procedure in the SM 510.

In some examples, the secondary eUICC 530 may transmit the subscription request 550 to the subscription system via the primary device 520. In this case, the primary device may include its MSISDN to enable the SM 510 to implement an optional profile download to the primary device 520 over, for example, an encrypted message 565.

In other examples, the secondary eUICC 530 may transit the subscription request 550 to the subscription system via the primary device 520, without the primary device 520 including its MSISDN. In this case, the SM 510 may optionally provision the secondary eUICC 530 utilizing an internet protocol (IP) connection, which may be the same connection utilized for transmitting subscription request 550.

In some further examples, the secondary eUICC 530 may transmit the subscription request 550 to the subscription system without utilizing the primary device.

Upon successful reception and validation of the subscription request from the secondary eUICC 530, the MNO 505 downloads a provisioning profile to the SM 510 at 555. The SM 510 may, in one example, then use a conventional wireless provisioning mechanism, say over an internet protocol (IP), to directly provision the secondary eUICC 530 at 560.

Alternatively, in one example, the SM 510 may download a profile to the primary subscriber wireless communication unit 520 at 565, say a short message service (SMS) message, to transmit to the secondary wireless communication unit 525 at 570. The secondary wireless communication unit 525 at 575, then forwards the encrypted message to the secondary eUICC 530 for the provisioning of the secondary eUICC 530.

In some examples, the encrypted message may include a special header to notify the secondary wireless communication nit 525 that it should forward the encrypted message onto the secondary eUICC 530 for decryption.

In this manner, provisioning of the secondary eUICC 530 may be achieved using the primary subscriber wireless communication unit 520 as a relay device.

Figure 6:
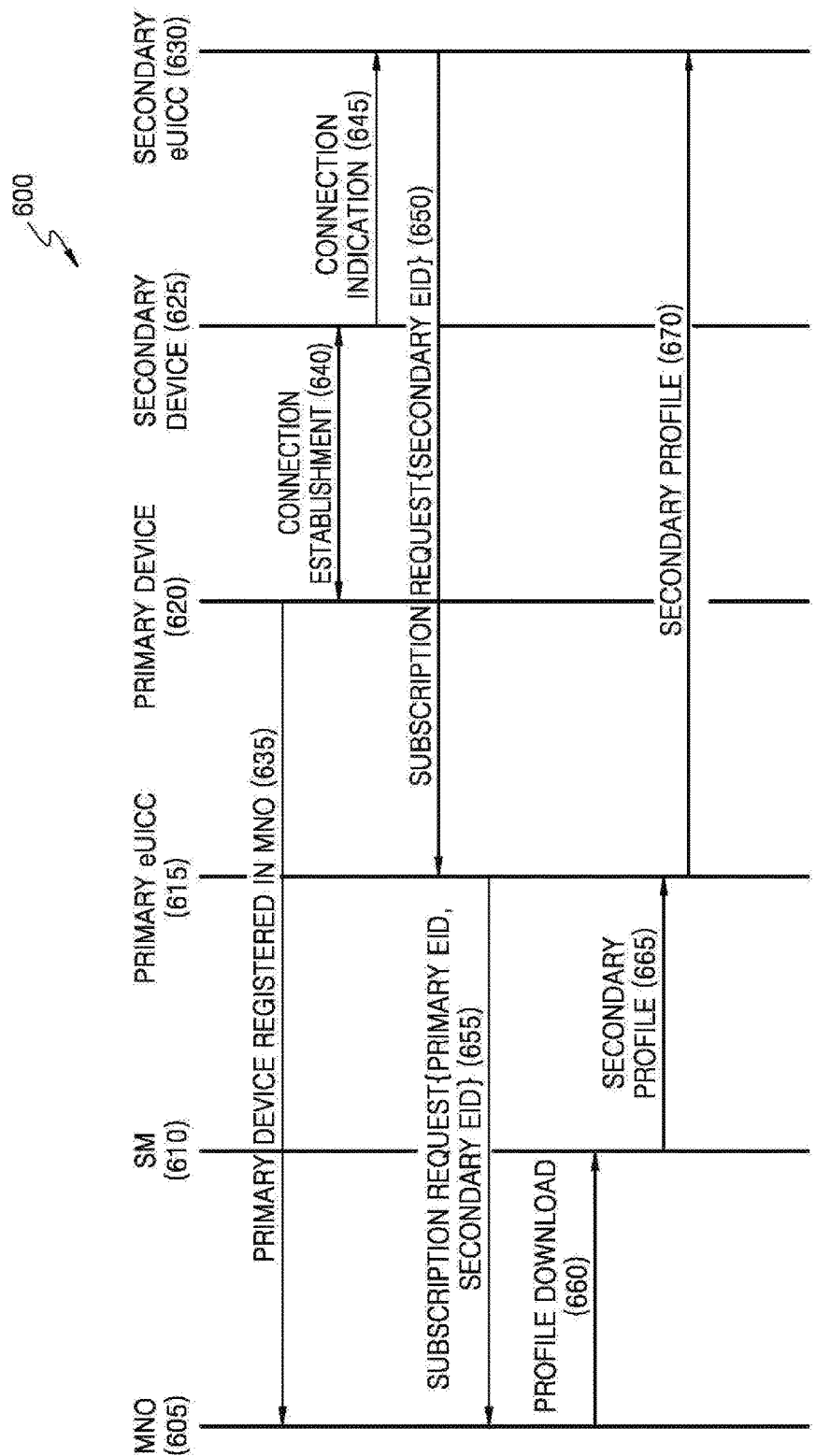
FIG. 6 illustrates a further message sequence chart for provisioning a secondary wireless communication unit via a primary subscriber wireless communication unit including a storage unit, according to some example embodiments of the disclosure.

Referring now to FIG. 6, an example message sequence chart 600 illustrates a further example mechanism for provisioning a secondary wireless communication unit from a primary subscriber wireless communication unit. The example message sequence chart 600 illustrates communications between a MNO 605, a SM 610, a primary eUICC 615, for example located within a primary subscriber wireless communication unit 620 that includes wireless transmit/receive capabilities, a secondary wireless communication unit 625 that includes a secondary eUICC 630.

The example message sequence chart 600 commences with the primary subscriber wireless communication unit 620 registering with the MNO 605 at 635. A connection is then established between the primary subscriber wireless communication unit 620 and the secondary wireless communication unit 625 at 640. The secondary wireless communication unit 625 then provides a connection indication to the secondary eUICC 630 at 645.

Once the secondary eUICC 630 has been informed of a communication link to the MNO 605 at 645, the secondary eUICC 630 sends a subscription request, which in one example includes its eID, to the primary subscriber wireless communication unit 620 at 650. In one example, the subscription request is sent to the primary eUICC. At 655, the primary eUICC 615 sends/forwards a subscription request to the MNO 605, which in one example includes its own eID and/or the eID of the secondary eUICC 630.

In addition, in some examples, upon successful reception and validation by the subscription manager of the primary eUICC, the subscription manager may use information from the primary subscriber wireless communication unit's 620 subscription to decide on a profile to be used for the secondary wireless communication unit 625. For example, if the primary subscriber wireless communication unit 620 is on, say, a Vodafone™ contract, then in one example embodiment the secondary wireless communication unit 625 may be offered a deal or a contract that links the secondary wireless communication unit 625 subscription to the primary subscriber wireless communication unit's 620 subscription.

Upon successful reception and validation of the subscription request from the secondary eUICC 630 (and in some examples reception and validation of the primary eUICC 615), the MNO 605 downloads a provisioning profile to the SM 610 at 660. The SM 610 may, in one example, then download the secondary provisioning profile for the secondary wireless communication unit 625 to the primary eUICC 615 of the primary subscriber wireless communication unit 620 at 665, say an SMS, including the secondary profile and transmits the message to the secondary wireless communication unit 625 or the secondary eUICC 630 of the secondary wireless communication unit 625 at 670. In this manner, provisioning of the secondary eUICC 630 may also be achieved using the primary subscriber wireless communication unit 620 as a relay device in the delivery of the profile, albeit with the primary device including storage capability to receive and forward the provisioning profile of the secondary eUICC 630.

Thus, in this example, the primary device (or primary device eUICC) may be validated to confirm that it is suitable and approved to receive the provisioning profile of the secondary eUICC 630 and/or provision the secondary eUICC 630 with a received provisioning profile from the SM 610.

Thus, in this manner, the eUICC in the secondary wireless communication unit may be provisioned either from the eUICC in the primary subscriber wireless communication unit or with the primary subscriber wireless communication unit or the eUICC in the primary subscriber wireless communication unit acting as an intermediary relay device. Thus, according to example embodiments of the disclosure, each UICC or eUICC manufactured no longer needs to be registered with a particular subscription manager 203, and may be sold un-provisioned, i.e. without a provisioning profile.

In example embodiments, the eUICC in the primary device is connected to a subscription manager that provides the information needed to provision the eUICC on the secondary device. For example when a user has an existing subscription on his/her mobile phone using a conventional SIM card, and purchases a secondary wireless communication unit, such as a Samsung™ Galaxy Gear™ that includes a cellular modem and an unprovisioned UICC or eUICC, the Samsung™ Galaxy Gear™ may be shipped without requiring the explicit ability to connect to a cellular network. In this scenario, the mobile phone or Samsung™ Galaxy Gear™ user would then pair the Samsung™ Galaxy Gear™ to the mobile phone in the conventional way, via say Bluetooth. An application residing on the mobile phone may then be run to connect to the network operator's web-based provisioning service, for example. This would prompt the user with subscription information. If the user decides to sign up to a contract with the network operator then the provisioning data may be sent securely via the mobile phone to the secondary wireless communication unit, such as the Samsung™ Galaxy Gear™. Thus a direct connection between the cellular network and the secondary wireless communication unit, such as a Samsung™ Galaxy Gear™, for the provisioning of the eUICC in the secondary wireless communication unit, such as a Samsung™ Galaxy Gear™ is not needed, as such provisioning may now be achieved via the primary subscriber wireless communication unit (e.g. the mobile phone).

Thus far, network operators have been somewhat reluctant to allow eUICC provisioning on any unit that resembles a consumer device as network operators are concerned that the ability to change operator easily in an over-the-air manner adversely affect their business models. The solutions presented herein resolve such concerns by providing the network operators the ability to potentially gain an extra subscription on a secondary wireless communication unit via a primary subscriber wireless communication unit that they already own (inasmuch as the SIM card is always owned by the network operator and not the subscriber).

It should be noted that some of the above mentioned embodiments and examples have described eUICCs 515/530 as operable to transmit requests, etc. to other network elements. These embodiments and examples may also forward primary/secondary eUICC requests via one or more relevant modules or circuits within the primary and/or secondary devices.

Figure 7:
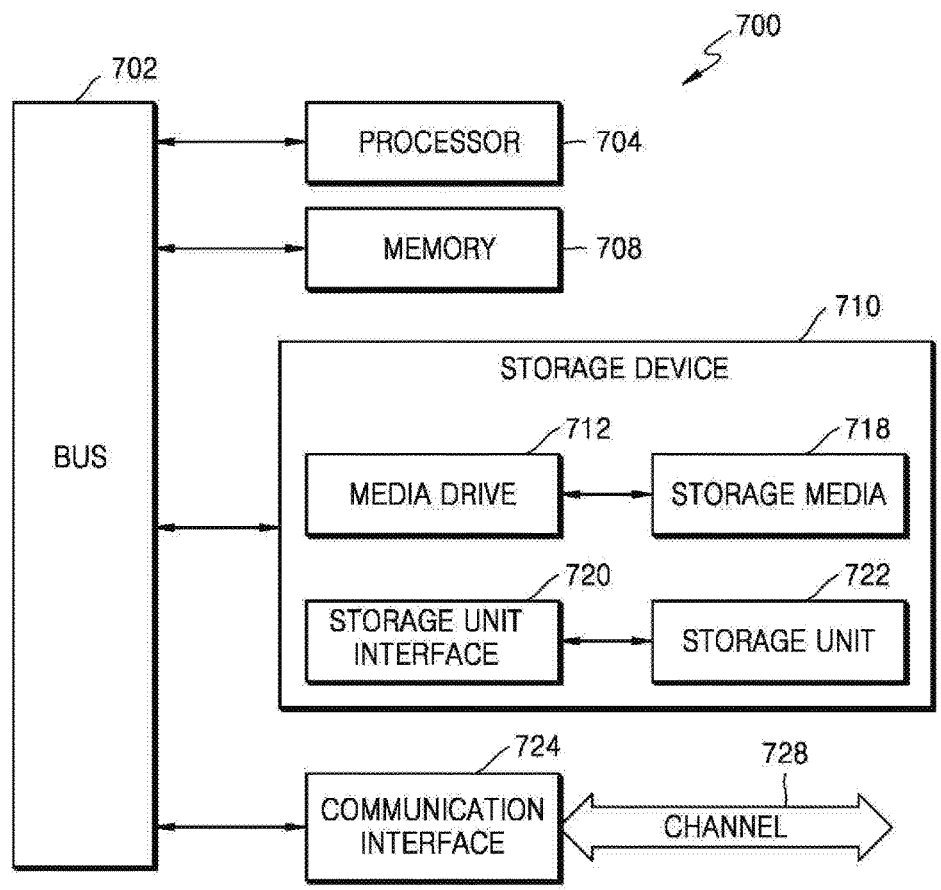
FIG. 7 illustrates a typical computing system that may be used to implement the eUICC provisioning method, according to some example embodiments of the disclosure.

Referring now to FIG. 7, there is illustrated a typical computing system 700 that may be used to implement software controlled switching between a first mode of operation where a backhaul link may be available and a second mode of operation where a backhaul link may not be available in some example embodiments of the disclosure. Computing systems of this type may be used in wireless communication units. Those skilled in the relevant art will also recognize how to implement the disclosure using other computer systems or architectures. A computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. The computing system 700 may include one or more processors, such as a processor 704. Processor 704 may be implemented using a general or special-purpose processing engine such as, for example, a microprocessor, microcontroller or other control logic. In this example, processor 704 is connected to a bus 702 or other communications medium.

The computing system 700 may also include a main memory 708, such as random access memory (RAM) or other dynamic memory, for storing information and instructions to be executed by processor 704. A main memory 708 also may be used for storing temporary variables or other intermediate information during execution of instructions to be executed by processor 704. The computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having particular computer software or data stored therein.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

The computing system 700 may also include a communications interface 724. The communications interface 724 may be used to allow software and data to be transferred between computing system 700 and external devices. Examples of communications interface 724 may include a modem, a network interface (such as an Ethernet or other NIC card), a communications port (such as for example, a universal serial bus (USB) port), a PCMCIA slot and card, etc. Software and data transferred via communications interface 724 are in the form of signals which may be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present disclosure. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 722, drive 712 or communications interface 724. The control logic (in this example, software instructions or computer program code), when executed by the processor 704, causes the processor 704 to perform the functions of the disclosure as described herein.

In one example, a tangible non-transitory computer program product includes executable program code operable for, switching between a first mode of operation where a backhaul link may be available and a second mode of operation where a backhaul link may not be available in some example embodiments of the disclosure.

It will be further appreciated that, for clarity purposes, the described embodiments of the disclosure with reference to different functional units and processors may be modified or re-configured with any suitable distribution of functionality between different functional units or processors is possible, without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the disclosure may be implemented in any suitable form including hardware, software, firmware or any combination of these. The disclosure may optionally be implemented, at least partly, as computer software running on one or more data processors and/or digital signal processors. For example, the software may reside on non-transitory computer program product including executable program code for provisioning a secondary wireless communication unit in a wireless communication system.

In one example, the program code may be used by a secondary wireless communication unit. The executable program code may be operable for, when executed at the secondary wireless communication unit, establishing (540) a connection with a primary subscriber wireless communication unit (520); transmitting a subscription request (550) to the primary subscriber wireless communication unit (325); receiving a provisioning profile in response to the subscription request; and provisioning an un-provisioned Universal Integrated Circuit Card (UICC) in the secondary wireless communication unit (525) with the received provisioning profile.

In one example, the program code may be used by a primary subscriber wireless communication unit. The executable program code may be operable for, when executed at the primary subscriber wireless communication unit, establishing a connection with a mobile network operator; informing the secondary wireless communication unit of the established connection with the mobile network operator; and receiving a subscription request from the secondary wireless communication unit based at least partly in response to informing the secondary wireless communication unit of the established connection.

Thus, the elements and components of an embodiment of the disclosure may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units. For example, the integrated circuit may be locatable in a secondary wireless communication unit 326 and suitable for provisioning an un-provisioned Universal Integrated Circuit Card (UICC) of the secondary wireless communication unit 326. Here, the integrated circuit includes a signal processor arranged to: receive a provisioning profile in response to a subscription request sent from the secondary wireless communication unit 326 to a primary subscriber wireless communication unit 325; and provision the un-provisioned UICC with the received provisioning profile. In some examples, the signal processor may be further arranged to transmit the subscription request to the primary subscriber wireless communication unit 325.

In another example, the integrated circuit may be locatable in primary subscriber wireless communication unit 325 and be suitable for provisioning an un-provisioned Universal Integrated Circuit Card (UICC) of a secondary wireless communication unit 326. Here, the integrated circuit includes a signal processor arranged to: establish a connection with a mobile network operator, inform a secondary wireless communication unit 326 of the established connection, and receive a subscription request from the secondary wireless communication unit 326 based at least partly in response to informing the secondary wireless communication unit 326 of the established connection.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures may be implemented to achieve the same functionality.

Figure 8:
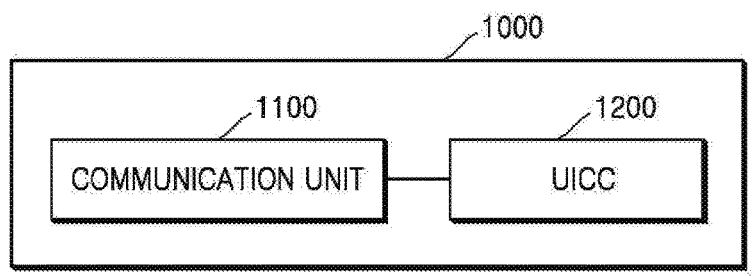
FIG. 8 illustrates a configuration of a second device according to some embodiments.

FIG. 8 illustrates a configuration of a second device 1000 according to some embodiments.

Referring to FIG. 8, the second device 1000 may include a communication unit 1100 and a UICC 1200. The communication unit 1100 may be a means for connecting the second device 1000 to external devices in various manners such as a wired or wireless manner. The communication unit 1100 may include the above-described transmitter and receiver. Also, the second device 1000 may further include a processor that controls an overall operation of the second device 1000. The processor may be an element corresponding to the above-described signal processor.

The communication unit 1100 may transmit a subscription request to a first device and may receive a provisioning profile in response to the subscription request. The UICC 1200 may be provisioned based on the received provisioning profile.

In this manner, the second device 1000 like the M2M device may be manufactured and/or sold along with a UICC which is not provisioned or is provisioned, and a provisioning mechanism may be provided through the first device possessed by an owner of the second device 1000.

As an optional example, the subscription request may be configured to be transferred to a mobile network operation of the first device. In this manner, the second device 1000 may use the first device as an intermediary/relay communication unit.

As an optional example, the UICC 1200 may be configured to directly receive the provisioning profile from a subscription manager in response to the subscription request. In this manner, the second device 1000 may be provisioned in the conventional way, for example, through an Internet protocol (IP). For example, if the second device 1000 is tethered by using a conventional data protocol (for example, Bluetooth™ or WiFi), a data connection may be made through the first device.

As an optional example, the UICC 1200 may be configured to receive the provisioning profile from the subscription manager through the first device. In this manner, the second device 1000 may use a primary subscription wireless communication unit as the intermediary/relay communication unit in a subscription request process as well as a provisioning process.

As an optional example, the second device 1000 may receive the provisioning profile from the first device through at least one of security data connections in an encrypted form so as to provide security to an authentication and provisioning process.

As an optional example, a security key that enables a security connection between the second device 1000 and the first device may be obtained from a key store in a network configured to store the second device UICC credentials.

As an optional example, the second device 1000 may further include a processor which is configured to set an operational profile of the second device 1000, at least partially based on the received provisioning profile.

As an optional example, the subscription request may include at least one identifier in a group consisting of an identifier of the second device 1000 and an identifier of the UICC 1200 of the second device 1000. In this manner, mobile network operators may validate the subscription request and/or the ability/authority of the first device capable of issuing a subscription request on behalf of the second device 1000.

As an optional example, the second device 1000 may be paired with the first device through a communication link and may transmit the subscription request to the first device, at least partially based on a pairing relationship. In this manner, only the first device which has been approved may be allowed to issue the subscription request on behalf of the second device 1000.

As an optional example, the provisioned UICC 1200 may be an eUICC.

As an optional example, the provisioned profile may be received from the subscription manager and may include a mobile network operator which is allocated differently from a mobile network operator for the first device. In this manner, the second device 1000 may variously select network providers, and for example, the second device 1000 may select a network provider that is specialized in a providing or competition rate of an M2M service.

As an optional example, the UICC 1200 [or an eUICC] of the second device 1000 may not be provisioned at an initial stage.

As an optional example, the UICC 1200 [or the eUICC] of the second device 1000 may be provisioned at the initial stage.

As an optional example, the provisioning profile may be received from the subscription manager and may include a plurality of user-selectable mobile network operators in order for a user to select the second device 1000. In this manner, larger-extent flexibility and selection may be provided to a user of the second device 1000.

The second device 1000 may denote the above-described secondary device or secondary wireless communication unit. Therefore, the above-described details may be all applied to the second device 1000.

Figure 9:
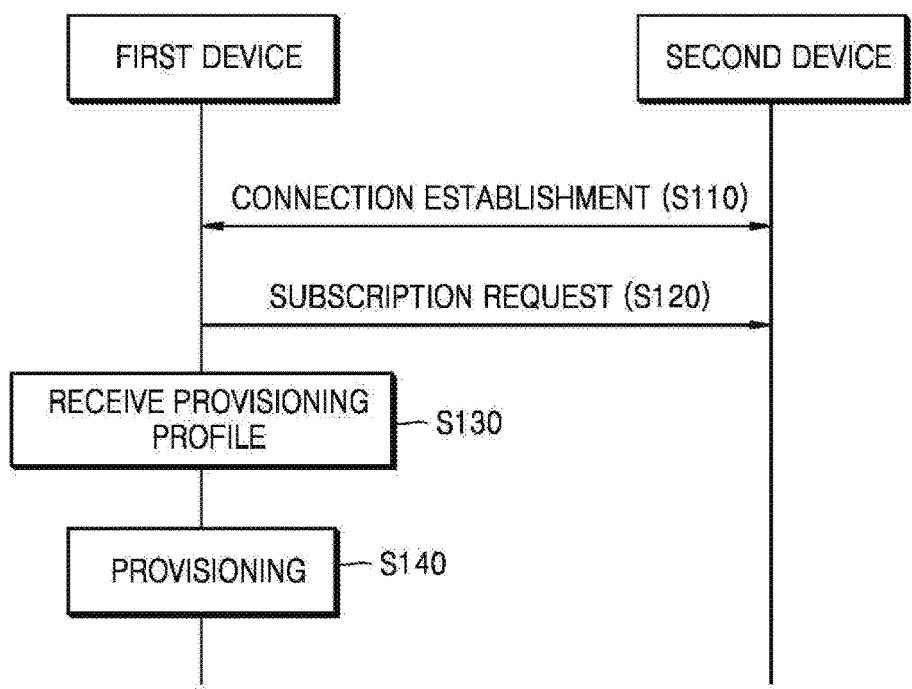
FIG. 9 is a flowchart for describing an operation method of a second device, according to some embodiments.

FIG. 9 is a flowchart for describing an operation method of a second device according to some embodiments.

Referring to FIG. 9, the second device may establish a connection with a first device in operation S110. In operation S120, the second device may transmit a subscription request to the first device. In operation S130, the second device may receive a provisioning profile in response to the subscription request. In operation S140, the second device may provision an UICC in the second device by using the received provisioning profile.

The operation method of the second device may be performed by the secondary device and the secondary wireless communication unit in the above-described drawings. Therefore, each of the operations of the operation method of the second device may be performed in the above-described way.

Figure 10:
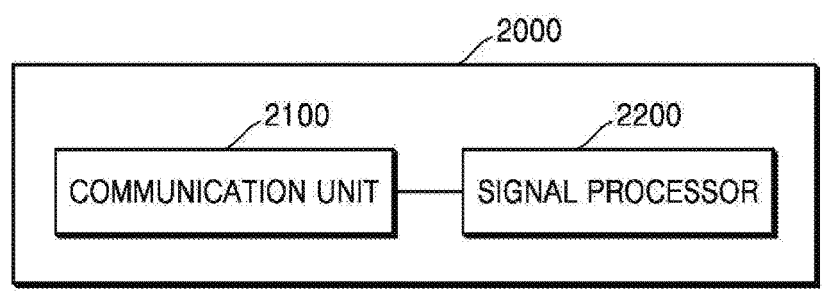
FIG. 10 illustrates a configuration of a first device according to some embodiments.

FIG. 10 illustrates a configuration of a first device 2000 according to some embodiments.

Referring to FIG. 10, the first device 2000 may include a communication unit 2100 and a signal processor 2200. The communication unit 2100 may be a means for connecting the first device 2000 to external devices, such as the second device, in various manners such as a wired or wireless manner. The communication unit 2100 may include the above-described transmitter and receiver. The signal processor 2200 may be an element corresponding to the signal processing module 408 described above with reference to FIG. 4, and thus, its detailed description is not provided.

The communication unit 2100 may establish a connection with a mobile network operator, notify the second device of the established connection, and receive a subscription request from the second device, at least partially based on a response to the established-connection notification.

As an optional example, the first device 2000 may be configured to function as a relay device between the second device and a mobile network operator associated with the first device 2000.

As an optional example, the communication unit 2100 may be configured to receive a provisioning profile for the second device from a subscription manager and may be configured to notify the second device of the provisioning profile. In this manner, the first device 2000 may relay the provisioning profile to the second device and moreover may easily issue a subscription request.

In a wireless communication system, the subscription manager may include a memory and a signal processor configured to receive the subscription request from the second device through the first device and transmit the provisioning profile to the second device directly or through the first device.

The wireless communication system may include at least one first device and at least one second device that transmits a subscription request to the at least one first device. A mobile network operator may be configured to receive the subscription request of the at least one second device from the at least one first device. A subscriber manager may be configured to receive a profile download of the at least one second device from the mobile network operator in response to the subscription request. The at least one second device may receive a provisioning profile from the subscriber manager in response to the subscription request and may include an UICC configured to be provisioned by using the receiving provisioning profile.

Although the present disclosure has been described in connection with some example embodiments, it is not intended to be limited to the specific form set forth herein. Rather, the scope of the present disclosure is limited only by the accompanying claims. Additionally, although a feature may appear to be described in connection with particular embodiments, one skilled in the art would recognize that various features of the described embodiments may be combined according to the disclosure. In the claims, the term 'including' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a'. 'an', 'first'. 'second', etc. do not preclude a plurality.

The invention claimed is:

1. A device comprising:
a universal integrated circuit card (UICC); and
a communication unit configured to:
when the UICC is not provisioned with any profile, transmit a subscription request to a primary subscriber device, and
receive a provisioning profile in response to the subscription request,
wherein the UICC is configured to be provisioned to directly access a network based on the provisioning profile and, when access to the network is requested, request the access based on the provisioning profile.

2. The device of claim 1, wherein the provisioning profile is received from a subscription manager.

3. The device of claim 2, wherein the provisioning profile is received from the primary subscriber device.

4. The device of claim 3, wherein the provisioning profile is encrypted.

5. The device of claim 1, further comprising:
a processor configured to set an operational profile based on the provisioning profile.

6. The device of claim 1, wherein the subscription request comprises at least one of an identifier of the device and an identifier of the UICC.

7. The device of claim 1, wherein the communication unit is paired with the primary subscriber device and is configured to transmit the primary subscriber device, at least partially based on the pairing.

8. The device of claim 1, wherein the provisioning profile comprises a different mobile network operator that is different from a mobile network operator for the primary subscriber device.

9. The device of claim 1, wherein the provisioning profile comprises a plurality of selectable mobile network operators.

10. A device comprising:
a signal processor; and
a communication unit configured to:
establish a connection with a mobile network operator,
notify a secondary device of the connection, and
in response to the notification, receive a subscription request from the secondary device for directly connecting to a network,
wherein the subscription request identifies another mobile network operator that is different from the mobile network operator.

11. The device of claim 10, wherein the signal processor is configured to function as a relay device between the secondary device and the mobile network operator.

12. The device of claim 10, wherein the communication unit is further configured to receive a provisioning profile for the secondary device from a subscription manager and transfer the provisioning profile to the secondary device.

13. An operation method of a device, the operation method comprising:
when a universal integrated circuit card (UICC) of the device is not provisioned with any profile, transmitting a subscription request to a primary subscriber device;
in response to the subscription request, receiving a provisioning profile for directly connecting to a mobile network operator;
provisioning the UICC based on the provisioning profile; and
when access to a network is requested, requesting the access based on the provisioning profile.

14. The operation method of claim 13, wherein the receiving of the provisioning profile comprises directly receiving the provisioning profile from a subscriber manager or receiving the provisioning profile from the subscriber manager through the primary subscriber device.

15. The operation method of claim 14, further comprising: establishing a connection with the primary subscriber device.

16. The operation method of claim 14, further comprising: setting an operational profile based on the provisioning profile.

17. The operation method of claim 14, wherein the subscription request comprises at least one of an identifier of the device and an identifier of the UICC.

18. The operation method of claim 14, further comprising: receiving a notification, indicating a connection established between the primary subscriber device and the mobile network operator, from the primary subscriber device.

19. A computer program product comprising one or more non-transitory computer readable storage media having a program for executing the operation method of claim 13.

* * * * *